United States Patent
Dosaki

(10) Patent No.: US 9,327,584 B2
(45) Date of Patent: May 3, 2016

(54) GLASS RUN FOR AUTOMOBILE

(71) Applicant: TOYODA GOSEI CO., LTD., Kiyosu-shi, Aichi-ken (JP)

(72) Inventor: Tomohiro Dosaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/334,713

(22) Filed: Jul. 18, 2014

(65) Prior Publication Data

US 2015/0082709 A1 Mar. 26, 2015

(30) Foreign Application Priority Data

Sep. 24, 2013 (JP) .................................. 2013-196694

(51) Int. Cl.
*E06B 7/16* (2006.01)
*B60J 10/04* (2006.01)
*B60J 10/00* (2016.01)

(52) U.S. Cl.
CPC ............ *B60J 10/042* (2013.01); *B60J 10/0094* (2013.01)

(58) Field of Classification Search
CPC ............................ B60J 10/042; B60J 10/0094
USPC ................................ 49/475.1, 479.1, 440, 441
See application file for complete search history.

(56) References Cited

U.S. PATENT DOCUMENTS

| 5,027,556 | A | * | 7/1991 | Ginster | ........................... 49/441 |
| 5,095,656 | A | * | 3/1992 | Keys | ................................ 49/441 |
| 5,414,961 | A | * | 5/1995 | Tessier | ............................ 49/441 |
| 5,636,895 | A | * | 6/1997 | Ito et al. | ..................... 296/146.9 |
| 6,301,834 | B1 | * | 10/2001 | Tyves | ................................ 49/441 |
| 8,302,350 | B2 | * | 11/2012 | Lee et al. | ..................... 49/475.1 |
| 8,646,213 | B2 | * | 2/2014 | Suzuki | ......................... 49/479.1 |
| 2002/0139054 | A1 | * | 10/2002 | Schlachter et al. | .......... 49/479.1 |
| 2004/0237412 | A1 | * | 12/2004 | Aritake et al. | .................. 49/441 |

FOREIGN PATENT DOCUMENTS

| JP | 2007-203767 A | 8/2007 |
| JP | 2009-107397 A | 5/2009 |
| JP | 2010-030411 A | 2/2010 |

* cited by examiner

*Primary Examiner* — Jerry Redman
(74) *Attorney, Agent, or Firm* — Posz Law Group, PLC

(57) ABSTRACT

A glass run capable of preventing noises from intruding into an automobile compartment from an interior of an automobile door via glass runs during running of an automobile. The glass run includes extruded parts and molded parts. Each of the extruded parts and the molded parts has a bottom wall, an outer side wall, and an inner side wall, which define a generally U-shaped cross-section. An outer seal lip and an inner seal lip respectively extend from open ends of the outer side wall and the inner side wall towards the interior of the glass run. A barrier rib is formed in at least one position of the molded parts between the inner side wall and the inner seal lip or between the outer side wall and the outer seal lip.

8 Claims, 6 Drawing Sheets

GLASS RUN FOR AUTOMOBILE

CROSS-REFERENCE TO RELATED APPLICATION

This application is related to and claims priority from Japanese patent Application No. 2013-196694 incorporated herein by reference.

BACKGROUND OF THE INVENTION

1. Field of the Invention

The present invention relates to a glass run adapted to guide a door glass as it is raised and lowered and seal the door glass, and including straight parts and corner parts.

2. Description of Related Art

As shown in FIG. 1, a glass run 10 is attached to an inner periphery of a door frame 12 of an automobile door 14 for guiding a door glass 16 as it is raised and lowered.

Conventionally, the glass run 10 is fitted in a channel 18 of the door frame 12 to guide the door glass 16 upwardly and downwardly, and provide a seal between the door glass 16 and the door frame 12.

As shown in FIG. 2, the glass run 10 includes extruded parts 20 formed by extrusion, and molded parts 22 adapted to connect the extruded parts 20 to each other and formed by molding. The molded parts 22 include corner molded parts 24 and a rear molded part 26. The extruded parts 20 define an upper side part 28, a front vertical side part 30 and a rear vertical side part 32 of the glass run 10.

The upper side part 28 of the glass run 10 is attached to an upper side 36 of the door frame 12, the front vertical side part 30 is attached to a front vertical side 38 of the door frame 12, and the rear vertical side part 32 is attached to a rear vertical side 40 of the door frame 12. The upper side part 28, the front vertical side part 30 and the rear vertical side part 32 are connected to each other via the corner molded parts 24 molded in conformity with the configuration of corners 42 of the door frame 12.

An upper portion and a lower portion of the rear vertical side part 32 are connected to each other by molding in the vicinity of a belt line of the automobile door 14 to define the rear molded part 26.

And in order to provide a seal between the automobile door 14 and an automobile body, a door weather strip (not shown) is attached to an outer periphery of a door panel and the door frame 12, and/or an opening trim weather strip (not shown) is attached to a flange provided in a door opening portion of the automobile body.

As shown in FIG. 3, the extruded part 20 of a main body of the glass run 10 has a generally U-shaped cross-section defined with an outer side wall 44, an inner side wall 46 and a bottom wall 48. An outer seal lip 50 is provided to extend from an open end of the outer side wall 44 towards an interior of the main body of the glass run 10. And an inner seal lip 52 is provided to extend from an open end of the inner side wall 46 towards the interior of the main body of the glass run 10. An outer cover lip 54 extends from the open end of the outer side wall 44 in parallel with an outside surface thereof, and an inner cover lip 56 extends from the open end of the inner side wall 46 in parallel with an outside surface thereof.

The outer side wall 44, the inner side wall 46 and the bottom wall 48 of the glass run 10 are fitted between a door outer panel 58, a door inner panel 60 and a door reinforcing panel 62 (see Japanese patent application laid-open No. 2007-203767, for example).

And when the glass run 10 is attached to the door frame 12, an end of the front vertical side part 30 and an end of the rear vertical side part 32 are inserted in an interior of the automobile door 14 to open so as to enable the rising and lowering of the door glass 16.

With this arrangement, during running of an automobile, running sound, etc. are transmitted from open ends of the front vertical side part 30 and the rear vertical side part 32 to an upper part of the glass run 10 via an interior thereof so as to be transmitted to an automobile compartment. As a result, running sound, etc. transmitted to the automobile compartment may hurt ears of vehicle passengers. In recent vehicles, quietness in automobile compartments has been improved, and prevention of such noises has been further required.

As shown in FIGS. 4 and 5, a door weather strip 64 adapted to be attached to an outer periphery of the door frame 12 has a shielding film 66 between a tubular seal portion 68 and a sub-seal lip 70 for preventing the transmission of noises (see Japanese patent application laid-open No. 2009-107397, for example).

This shielding film 66 prevents wind noises generated when automobiles are running, but cannot prevent the transmission of noises from an interior of the automobile door.

And, as shown in FIGS. 6 and 7, a plurality of shock absorption lips 72 are provided in an interior surface of a bottom wall of an upper side part 76 of a glass run 78 (see Japanese patent No. 5140514 for example).

In this case, when the door glass 16 is raised, as shown in FIG. 7, the shock absorption lips 72 absorb shock generated due to striking of an upper end of the door glass 16 against the bottom wall 74, but cannot prevent the transmission of noises from the interior of the automobile door.

SUMMARY OF THE INVENTION

It is an object of the present invention to provide a glass run capable of preventing noises from intruding into an automobile compartment from an interior of an automobile door via glass runs during running of an automobile.

In order to achieve the above-described object, according to a first aspect of the present invention, a glass run for an automobile, which is adapted to be attached along an inner periphery of a door frame of an automobile door for guiding a door glass as it is raised and lowered, includes extruded parts formed by extrusion, and molded parts, each adapting to connect the extruded parts to each other, by molding.

Each of the extruded parts and the molded parts includes a main body having a generally U-shaped cross-section defined with a bottom wall, an outer side wall extending from an outer side edge of the bottom wall, and an inner side wall extending from an inner side edge of the bottom wall. An outer seal lip and an inner seal lip respectively extend from open ends of the outer side wall and the inner side wall in an interior of the main body with a generally U-shaped cross-section.

A barrier rib is formed in at least one position of the molded parts between the inner side wall and the inner seal lip or between the outer side wall and the outer seal lip.

In the first aspect of the present invention, the glass run includes extruded parts formed by extrusion, and molded parts, each adapting to connect the extruded parts to each other by molding, so that the cross-sectional shape of the extruded parts can be changed according to attaching areas of the inner periphery of the door frame of the automobile door, and the extruded parts having different cross-sectional shapes can be jointed with the molded parts while changing the cross-sectional shapes thereof.

Each of the extruded parts and the molded parts includes a main body having a bottom wall, an outer side wall extending from an outer side edge of the bottom wall, and an inner side wall extending from an inner side edge of the bottom wall, and defining a generally U-shaped cross-section. An outer seal lip and an inner seal lip respectively extend from open ends of the outer side wall and the inner side wall in an interior of the main body with a generally U-shaped cross-section.

Therefore, an end edge of the door glass can be accommodated in an interior of the main body with a generally U-shaped cross-section, which includes the outer side wall, the inner side wall and the bottom wall, thereby securely holding the door glass, and the outer seal lip and the inner seal lip contact the door glass according to the rising and lowering of the door glass, thereby providing a seal between the door frame and the door glass.

A barrier rib is formed in at least one position of the molded parts between the inner side wall and the inner seal lip or between the outer side wall and the outer seal lip so that noises can be prevented from intruding in an automobile compartment from an open end of a glass run fitted in an interior of an automobile door after passing between the inner side wall and the inner seal lip, or between the outer side wall and the outer seal lip.

According to a second aspect of the present invention, the barrier rib is formed continuously with the inner side wall or the inner seal lip so as to define a barrier gap against the other one of the inner side wall and the inner seal lip, or the barrier rib is formed continuously with the outer side wall or the outer seal lip so as to define another barrier gap against the other one of the outer side wall and the outer seal lip.

In the second aspect of the present invention, the barrier rib is formed continuously with one of the inner side wall and the inner seal lip so as to define a barrier gap against the other one of the inner side wall and the inner seal lip, or the barrier rib is formed continuously with one of the outer side wall and the outer seal lip so as to define another barrier gap against the other one of the outer side wall and the outer seal lip. Therefore, when the door glass is raised to enter the interior of the glass run, and the inner seal lip and the outer seal lip are respectively flexed toward the inner side wall and the outer side wall, the inner seal lip and the outer seal lip are readily flexed by virtue of the barrier gaps, thereby enabling smooth rising and lowering of the door glass. In addition, when the inner seal lip and the outer seal lip are flexed, the barrier gaps are closed to ensure sound insulation properties.

According to a third aspect of the present invention, the barrier rib is formed away from the bottom wall.

In the third aspect of the present invention, the barrier rib is formed away from the bottom wall so that the inner seal lip or the outer seal lip readily bends, thereby enabling smooth rising and lowering of the door glass.

According to a fourth aspect of the present invention, the barrier rib includes a plurality of barrier ribs formed in one of the molded sections such that the barrier gaps are shifted relative to each other.

In the fourth aspect of the present invention, the barrier rib includes a plurality of barrier ribs formed in one of the molded sections so that sound insulation in the interior of the glass run is further improved.

Since the barrier gaps are shifted relative to each other, a passing route of sound in the interior of the glass run bends so that noises are hardly transmitted, thereby further improving sound insulation properties in the interior of the glass run.

According to a fifth aspect of the present invention, the barrier rib is formed so as to be inclined to a longitudinal direction of the glass run.

In the fifth aspect of the present invention, the barrier rib is formed so as to be inclined to a longitudinal direction of the glass run so that when the door glass is raised and lowered in the interior of the glass run, the inner seal lip or the outer seal lip are gradually flexed in an inclined area of the barrier rib to enable smooth rising and lowering of the door glass.

According to a sixth aspect of the present invention, the extruded part includes an upper side part adapted to be attached to an upper side of the door frame, and vertical side parts adapted to be attached to vertical sides of the door frame, and the molded parts include corner molded parts adapted to connect the upper side part to the vertical side parts and to be attached to corners of the door frame, and vertical side molded parts adapted to be connected to the vertical side parts in the vicinity of a belt line thereof.

In the sixth aspect of the present invention, the extruded part includes an upper side part adapted to be attached to an upper side of the door frame, and vertical side parts adapted to be attached to vertical sides of the door frame so that the cross-sectional shapes of the upper side part and the vertical side parts can be changed for improving the sealing properties thereof.

The molded parts include corner molded parts adapted to connect the upper side part to the vertical side parts and to be attached to corners of the door frame, and vertical side molded parts adapted to be connected to the vertical side parts in the vicinity of a belt line thereof, thereby securely connecting the extruded parts in the corners and in the vicinity of the belt line of the vertical side parts to ensure the sealing properties.

According to a seventh aspect of the present invention, the barrier rib is formed in both the vertical side molded parts and the corner molded parts.

In the seventh aspect of the present invention, the barrier rib is formed in both the vertical side molded parts and the corner molded parts so that sound transmitted from a front vertical side of an automobile body and sound transmitted from a rear side of the automobile body can be securely blocked in both molded parts, thereby further improving sound insulation properties.

According to an eighth aspect of the present invention, the barrier rib has a thickness ranging from 0.8 mm to 2 mm.

In the eighth aspect of the present invention, the barrier rib has a thickness ranging from 0.8 mm to 2 mm so that sufficient sound insulation properties are effected, and the inner seal lip or the outer seal lip readily bends, whereby the door glass is smoothly raised and lowered. When the thickness of the barrier rib is less than 0.8 mm, sound insulation properties degrade, and the strength of the barrier rib decreases so that the barrier rib may be broken due to a long period of use. When the thickness of the barrier rib exceeds 2 mm, the inner seal lip or the outer seal lip is hardly flexed, and consequently, the door glass cannot be smoothly raised nor lowered.

In accordance with the present invention, a barrier rib is formed in at least one position of the molded parts between the inner side wall and the inner seal lip or between the outer side wall and the outer seal lip so that noises can be prevented from intruding into an automobile compartment from an open end of a glass run fitted in an interior of an automobile door after passing between the inner side wall and the inner seal lip, or between the outer side wall and the outer seal lip.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
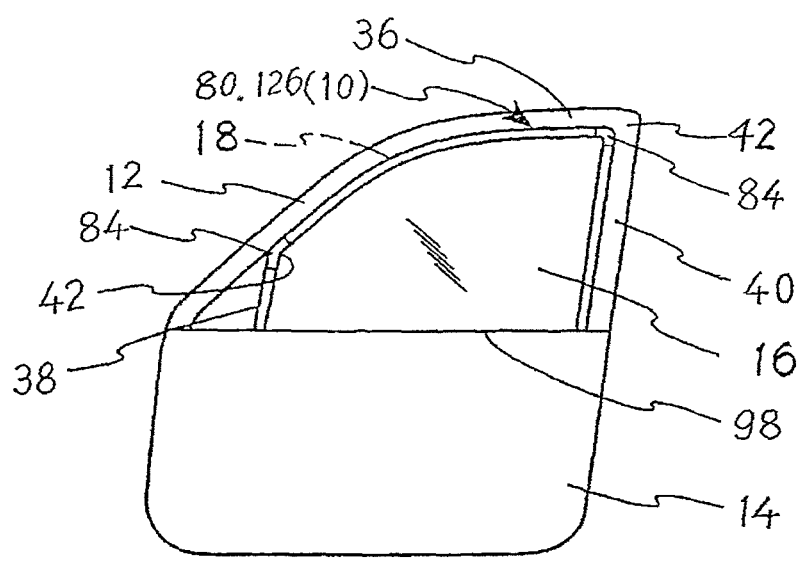
FIG. 1 is a front view of a door of an automobile.
Figure 2:
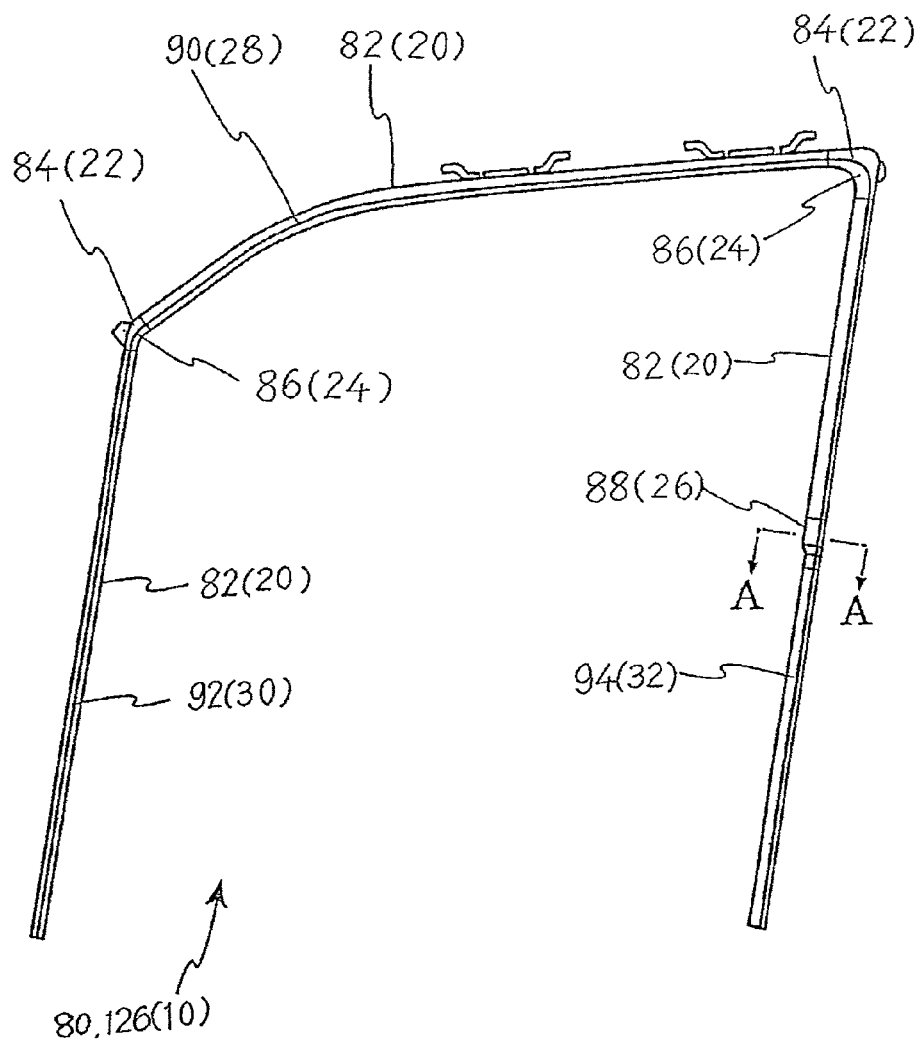
FIG. 2 is a front view showing embodiments of a glass run in accordance with the present invention along with a conventional glass run.
Figure 3:
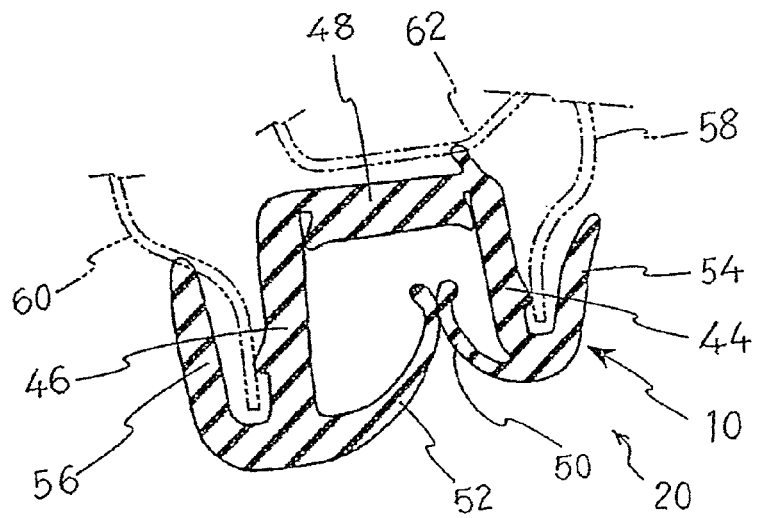
FIG. 3 is a cross-sectional view of a conventional glass run that is attached to an upper side of a door frame.
Figure 4:
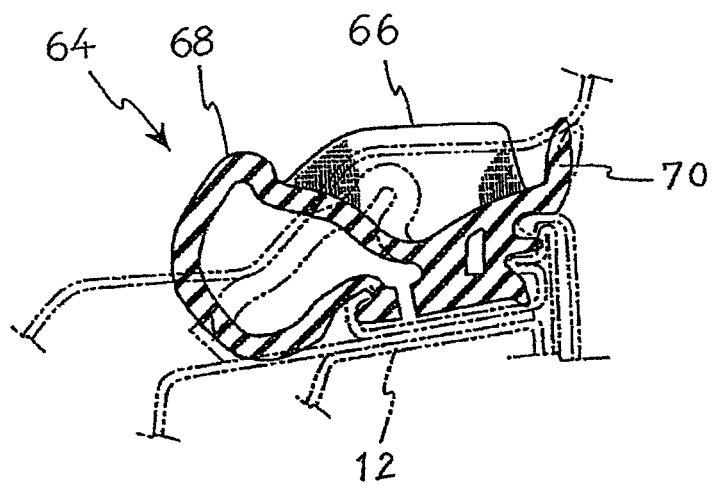
FIG. 4 is a cross-sectional view of a molded part of a conventional door weather strip.
Figure 5:
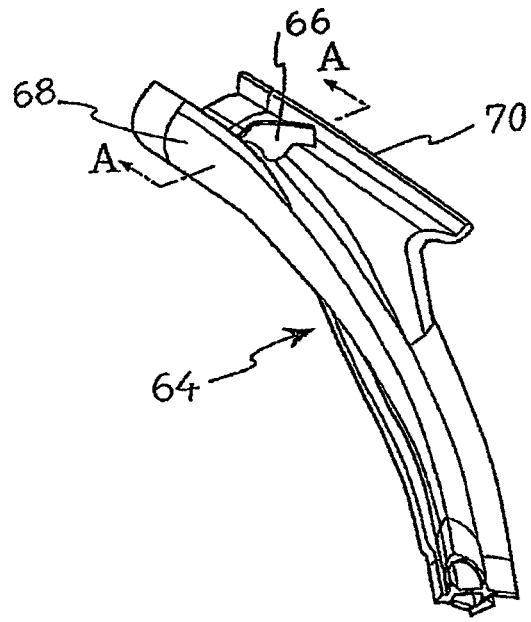
FIG. 5 is a perspective view of a molded part of the conventional door weather strip.
Figure 6:
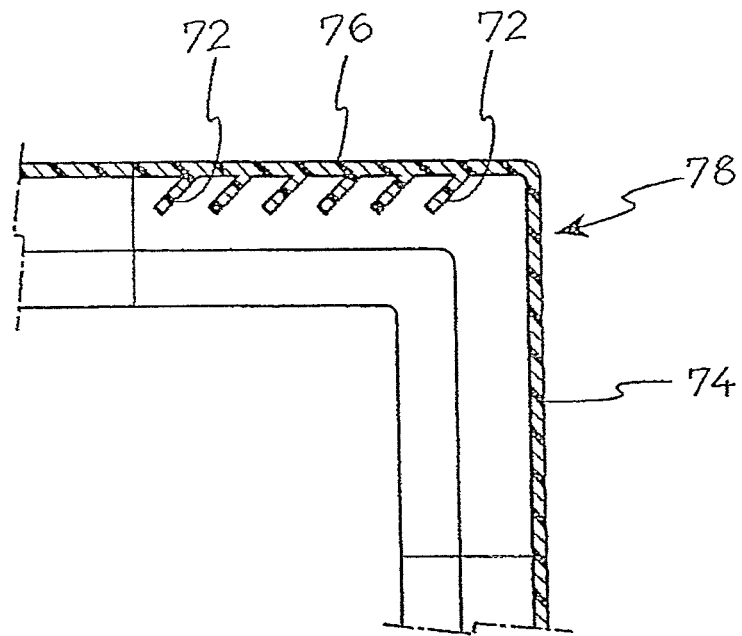
FIG. 6 is a sectional view of a molded part of another conventional glass run in the state where a door glass is lowered.
Figure 7:
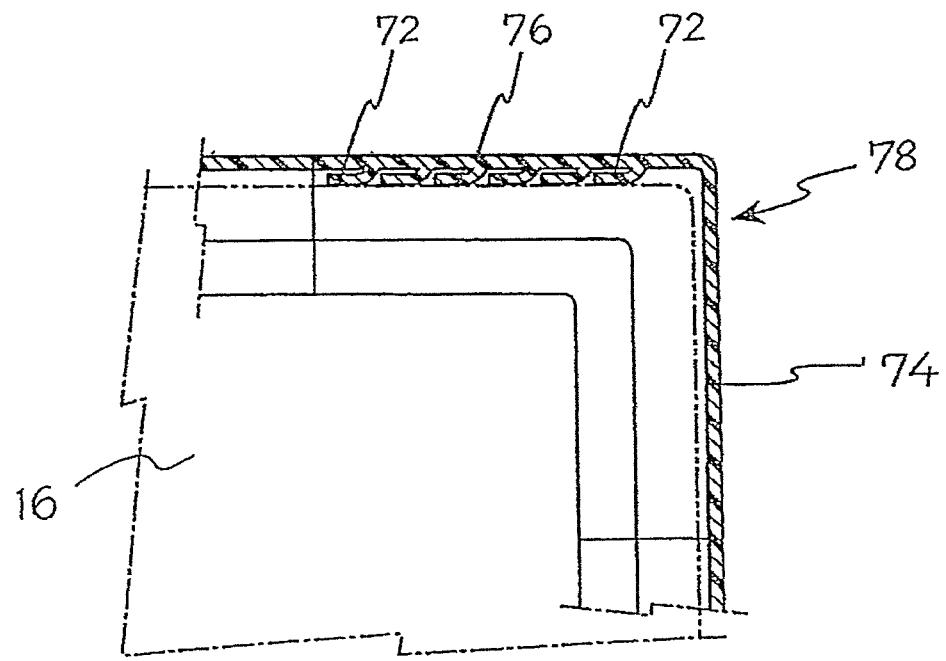
FIG. 7 is a sectional view of a molded part of another conventional glass run in the state where a door glass is raised.

Embodiments of the present invention will be explained with reference to FIG. 1, FIG. 2 and FIG. 8 through FIG. 11. FIG. 1 is a front view of a front door 14 of an automobile. FIG. 2 is a front view of a glass run 80 for attachment to a door frame 12 of the front door 14. As shown in FIG. 1, the door frame 12 is provided in an upper portion of the door 14, and a door glass 16 is attached to the door frame 12 so as to be raised and lowered therealong. A glass run 80 is attached along an inner periphery of the door frame 12 to guide the door glass 16 as it is raised and lowered, and provide a seal between the door glass 16 and the door frame 12.

As shown in FIG. 2, the glass run 80 includes extruded parts 82 and molded parts 84. The extruded parts 82 are formed by extrusion. The molded parts 84 are attached to corners 42 of the door frame 12, connect the extruded parts 82 to each other, and are formed by molding. As described later, the molded parts 84 include corner molded parts 86 and a rear vertical side molded part 88.

The extruded parts 82 include an upper side part 90 for attachment to the upper side 36 of the door frame 12, a front vertical side part 92 for attachment to the front vertical side 38 of the door frame 12, and a rear vertical side part 94 for attachment to the rear vertical side 40 of the door frame 12.

In order to conform these extruded parts 82 to the door frame 12, the molded parts 84 are provided, and these molded parts 84 are formed by molding in front and rear corners of the door frame 12. As a result, the upper side part 90, the front vertical side part 92 and the rear vertical side part 94 are connected to each other to define front and rear corner molded parts 86. In addition, the rear vertical side molded part 88 is molded between an upper portion and a lower portion of the rear vertical side part 94 in the vicinity of a belt line 98.

Hereinafter, embodiments will be explained based on the rear vertical side part 94 for attachment to the rear vertical side 40 of the door frame 12 of the front door 14, and more specifically based on the rear vertical side molded part 88 and the rear corner molded part 86.

First, the extruded part 82 of the glass run 80 will be explained based on the rear vertical side part 94.

Figure 8:
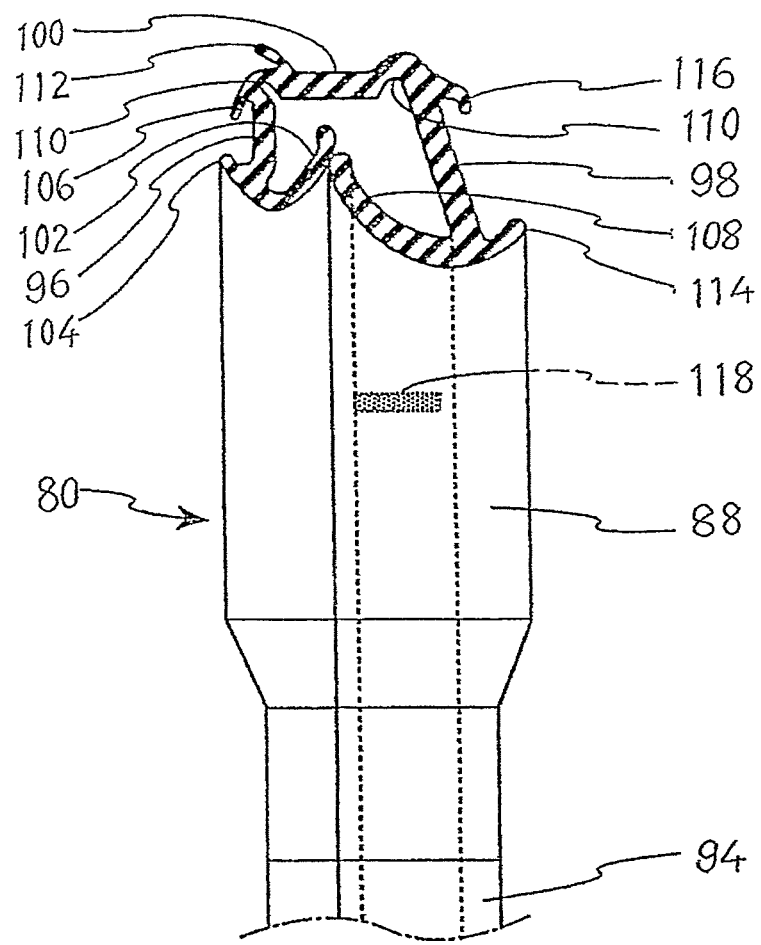
FIG. 8 is a perspective view of a molded part of a first embodiment of a glass run in accordance with the present invention.

As shown in FIG. 8, the rear vertical side part 94 of the glass run 80 includes a main body composed of an outer side wall 96, an inner side wall 98 and a bottom wall 100 so as to define a generally U-shaped cross-section. As described later, the inner side wall 98 is formed to have a width and a thickness greater than those of the outer side wall 96 so as to have an asymmetrical cross-sectional shape of which an inner side is greater than an outer side.

The main body of the glass run 80 has a substantially similar U-shaped cross-section in both the upper side part 90 for attachment to the upper side 36 of the door frame 12 and the rear vertical side part 94 for attachment to the rear vertical side 40 of the door frame 12.

The outer side wall 96 of the glass run 80 is formed to have a generally plate-shaped cross-section.

An outer seal lip 102 extends from an open end of the outer side wall 96 in an interior of the main body of the glass run 80. And an outer cover lip 104 extends outwardly from the open end of the outer side wall 96 so as to cover an end of the door outer panel 58.

Therefore, the outer cover lip 104 covers the end of the door outer panel 58 so that the door outer panel 58 is not striking when seen from the vehicle exterior side to provide a good appearance.

An outer holding lip 106 is formed on an exterior surface of the outer side wall 96. A flange portion of the door outer panel 58 has a bending part, and the outer holding lip 106 is fit in the bending part of the door outer panel 58, whereby the outer side wall 96 can be attached to the door outer panel 58 with the outer cover lip 104 and the outer holding lip 106.

As a result, the outer side wall 96 can be securely attached to the door outer panel 58, and the outer side wall 96 and the door outer panel 58 can be sealed.

As described above, the outer seal lip 102 is provided inside the outer side wall 96 so as to obliquely extend in the interior of the main body of the glass run 80.

When the door glass 16 is raised, and an upper end thereof is inserted in the interior of the main body of the glass run 80, this outer seal lip 102 and a later-described inner seal lip 108 elastically contact both surfaces of the door glass 16 to seal a gap between the upper end of the door glass 16 and the door frame 12.

Low friction sliding members can be provided on surfaces of the outer seal lip 102 and the inner seal lip 108. In this case, when the door glass 16 is raised and slides along the vertical side part of the glass run 80, both the contacting area and the friction resistance between the door glass 16 and the glass run 80 decrease to reduce the sliding resistance, and consequently, the generation of noises can be prevented and smooth sliding of the door glass can be ensured. When the door glass 16 curves during rising and lowering thereof, or when a negative pressure is generated during running of an automobile, the door glass 16 may shift outwardly, or may be flexed to be strongly pressed against the outer seal lip 102. But, by using low friction sliding members, smooth sliding of the door glass 16 can be ensured without increasing the sliding resistance of the door glass 16.

The bottom wall 100 is formed into a generally plate-shaped configuration, and a groove 110 is respectively formed between the inner side wall 98 and the bottom wall 100 and between the outer side wall 96 and the bottom wall 100 so as to enable the bottom wall 100 to readily bend therealong.

A bottom seal lip 112 is formed on an exterior surface of the bottom wall 100 so as to extend in a longitudinal direction thereof, and the bottom seal lip 112 contacts the door reinforcing panel 62 or a channel of the door frame 12 to provide a seal between the bottom wall 100 and the door reinforcing panel 62.

A low friction sliding member is provided on an interior surface of the bottom wall 100 by extruding the low friction sliding member or applying the low friction sliding material such as urethane resin, similarly to the outer seal lip 102 and the inner seal lip 108. With this arrangement, the sliding resistance against the door glass 16 can be reduced.

The inner side wall 98 is made thicker and greater than the outer side wall 96. Therefore, the glass run 80 can be held with an outer side surface of the door frame 12.

An inner cover lip 114 is formed to extend from an open end of the inner side wall 98 outwardly of the inner side wall 98, namely in the direction of an automobile compartment.

The inner seal lip 108 obliquely extends from an open end of the inner side wall 98 in the interior of the main body of the glass run 80. The inner seal lip 108 is made longer and thicker than the outer seal lip 102 so that when the door glass 16 enters the interior of the glass run 80, the door glass 16 can be located outwardly, and consequently, a difference in level between the door frame 12 and the door glass 16 can be reduced. Therefore, air resistance and wind noises can be reduced, and this arrangement is also favorable in design.

An inner holding lip 116 extends from a joint between the inner side wall 98 and the bottom wall 100. A projection is formed in the channel of the door frame 12 by bending the door frame 12. The inner holding lip 116 is engaged with this projection. As a result, the glass run 80 can be held with the door frame 12.

The molded parts 84 of the glass run 80 will be explained based on the rear vertical side molded part 88 with reference to FIGS. 8 through 11. A later-described barrier rib can be similarly formed in the corner molded parts 86.

Figure 9:
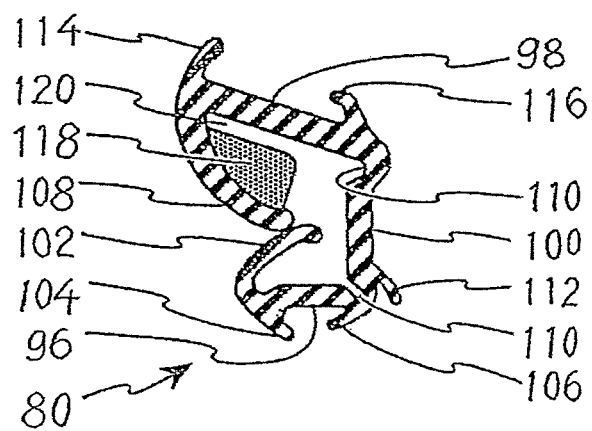
FIG. 9 is a cross-sectional view of a molded part of the first embodiment of a glass run in accordance with the present invention.

First, a first embodiment will be explained, and then, a second embodiment will be explained. In the first embodiment, as shown in FIG. 8 and FIG. 9, the rear vertical side molded part 88 includes the outer side wall 96, the inner side wall 98, the bottom wall 100, the outer seal lip 102 and the inner seal lip 108, similarly to the extruded part 82.

In the rear vertical side molded part 88, an inner barrier rib 118 is provided between the inner side wall 98 and the inner seal lip 108. Alternatively, an outer barrier rib can be provided between the outer side wall 96 and the outer seal lip 102. Both the inner barrier rib 118 and the outer barrier rib can be provided.

When the glass run 80 is attached to the automobile door 14, ends of the glass run 80 is attached in an interior of the door panel to guide the sliding of the door glass 16. At this time, the ends of the glass run 80 attached in the interior of the door 14 are opened so that noises enter an interior of the glass run 80 from the open ends thereof via a space between the inner side wall 98 and the inner seal lip 108. When the noises enter the interior of the glass run 80, the inner barrier rib 118 can block the transmission of noises.

In the first embodiment, the inner barrier rib 118 is formed at right angles to the longitudinal direction of the glass run 80.

In the first embodiment, the inner barrier rib 118 extends from an interior surface of the inner seal lip 108 to define a barrier gap 120 between the inner barrier rib 118 and the inner side wall 98. As described later, where the inner barrier rib 118 is formed to extend from the inner side wall 98, an inner barrier gap 120 is defined between the inner seal lip 108 and the inner barrier rib 118.

When the door glass 16 is raised, and enters the interior of the glass run 80, the inner seal lip 108 is readily flexed towards the inner side wall 98 by virtue of the inner barrier gap 120, thereby enabling smooth sliding of the door glass 16. In addition, when the inner seal lip 108 is flexed, the inner barrier gap 120 is closed to ensure sound insulation properties.

Where the outer barrier rib is provided between the outer side wall 96 and the outer seal lip 102, similar operation effects can be ensured.

The inner barrier rib 118 is provided away from the bottom wall 100. Therefore, the inner seal lip 108 is prevented from being pulled with the inner barrier rib 118, and consequently, the inner seal lip 108 is readily flexed to ensure smooth rising and lowering of the door glass 16. Where an outer barrier rib is provided, it is formed away from the bottom wall 100, similarly.

A plurality of inner barrier ribs 118 can be provided in the rear vertical side molded section 88. In this case, it is preferable to form the inner barrier gaps 120 so as to be shifted relative to each other. More specifically, one inner barrier rib 118 is formed to extend from the inner seal lip 108 to define an inner gap between the inner barrier rib 118 and the inner seal lip 108.

With this arrangement, since a plurality of inner barrier ribs 118 are provided, high sound insulation properties are effected. In addition, since the inner barrier gaps 120 are provided so as to be shifted relative to each other, a sound passing route inside the glass run 80 is bent so that noises are hardly transmitted, whereby the sound insulation properties in the interior of the glass run 80 are further improved.

The barrier rib can be formed in both the rear vertical side molded part 88 and the corner molded part 86. In this case, transmission of the sound from the front vertical side part 92 and sound from the rear vertical side part 94 can be securely prevented with both the corner molded part 86 and the rear vertical side molded part 88, whereby sound insulation properties can be further improved.

It is preferable that the inner barrier rib 118 has a thickness ranging from 0.8 mm to 2 mm. In this case, sufficient sound insulation properties are exhibited, the inner seal lip 108 is readily flexed, and the door glass 16 can be smoothly raised and lowered. Where the thickness of the inner barrier rib 118 is less than 0.8 mm, the sound insulation properties are degraded, and the strength of the inner barrier rib 118 decreases so as to be broken during long-term use. Whereas the thickness of the inner barrier rib 118 exceeds 2 mm, the inner barrier rib 118 exhibits large rigidity so that the inner seal lip 108 is hardly flexed so that the door glass 16 cannot be smoothly raised nor lowered.

Figure 10:
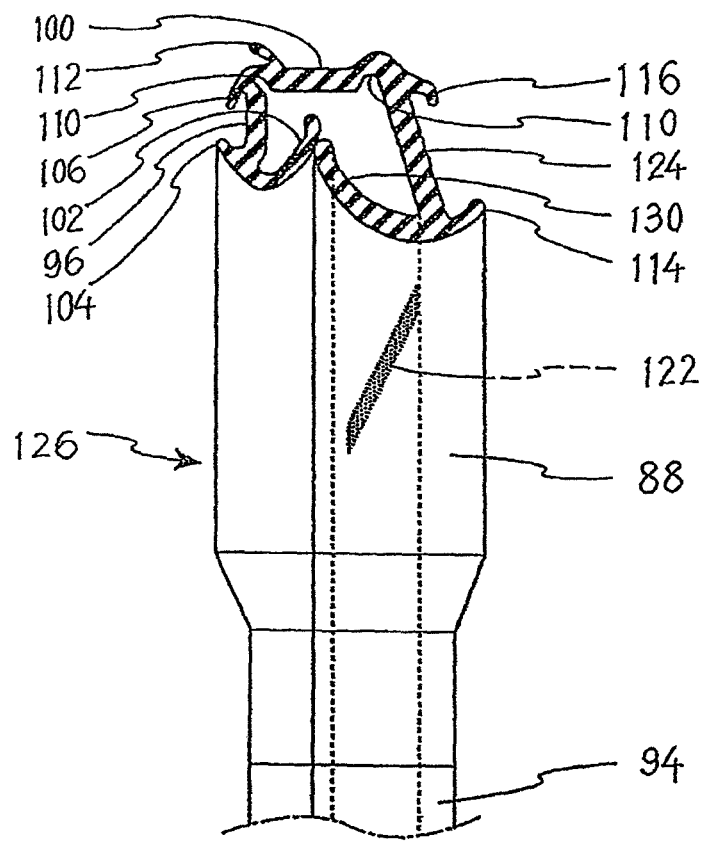
FIG. 10 is a perspective view of a molded part of a second embodiment of a glass run in accordance with the present invention.
Figure 11:
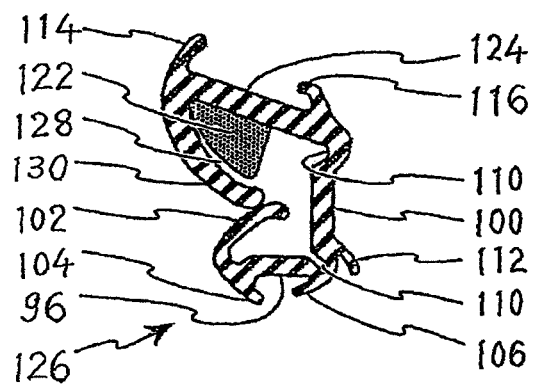
FIG. 11 is a cross-sectional view of a molded part of the second embodiment of a glass run in accordance with the present invention.

Next, a second embodiment will be explained with reference to FIG. 10 and FIG. 11. The second embodiment differs from the first embodiment in that an inner barrier rib 122 extends from an inner side wall 124 so as to be inclined to the longitudinal direction of a glass run 126. The remaining structure of the second embodiment is substantially similar to that of the first embodiment. Therefore, explanations of similar structures will be omitted, but only different structures will be explained.

In the first embodiment, the inner barrier rib 118 is formed to extend from the interior surface of the inner seal lip 108, but in the second embodiment, the inner barrier rib 122 is formed to extend from the interior surface of the inner side wall 124. Therefore, a barrier gap 128 is defined between the inner barrier rib 122 and an inner seal lip 130. In this case, when the door glass 16 is raised and lowered, the inner seal lip 130 is readily flexed, similarly to the inner seal lip 108 of the first embodiment.

The inner barrier rib 122 is formed so as to be inclined to the longitudinal direction of the glass run 126. In this case, when the door glass 16 is raised and lowered in an interior of the glass run 126, the inner seal lip 130 contacts an inclined area of the inner barrier rib 122 and is gradually flexed so that the door glass 16 can be smoothly raised and lowered.

Next, the production method of the glass runs 80 and 126 will be explained. The extruded parts 82 are formed of a synthetic rubber such as an EPDM rubber, or a thermoplastic elastomer such as a polyolefin elastomer, etc.

Where the synthetic rubber is used, after extruded, it is heated for vulcanizing in a vulcanization chamber with a hot air, high frequency wave, etc. Where the thermoplastic elastomer is used, it is cooled for solidifying. Then, the resultant material is cut to obtain extruded parts, each having a predetermined length.

Next, the molded parts 84 are molded by cutting the thus obtained extruded parts to predetermined dimensions at generally right angles to the longitudinal direction thereof, placing cut ends of the extruded parts 82 in a mold adapted to mold the molded parts 84, and injecting a solid material adapted to mold the molded parts 84 in a cavity of the mold. The molded part 84 has a generally identical cross-section to that of the extruded part 82. It is preferable that the material for the molded part is of the same kind as the material for the extruded part. Where the thermoplastic elastomer is used, the material is in a molten state when injected into the mold so that the molded part is integrally welded to the extruded part with heat and pressure thereof.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for an automobile, which is adapted to be attached along an inner periphery of a door frame of an automobile door for guiding a door glass into a glass run as the door glass is raised and lowered, comprising:
    extruded parts formed by extrusion, and molded parts, each adapting to connect said extruded parts to each other by molding, wherein
    each of said extruded parts and said molded parts includes a main body having a bottom wall, an outer side wall that extends from an outer side edge of said bottom wall, and an inner side wall that extends from an inner side edge of said bottom wall, which define a generally U-shaped cross-section, a longitudinal direction of the glass run being perpendicular to the generally U-shaped cross-section,
    an outer seal lip and an inner seal lip are respectively provided in said outer side wall and said inner side wall so as to respectively extend from open ends of said outer side wall and said inner side wall in an interior of said main body with the generally U-shaped cross-section,
    a barrier rib is formed in at least one position of said molded parts at least one of between said inner side wall and said inner seal lip and between said outer side wall and said outer seal lip, the barrier rib is disposed on said inner side wall or said inner seal lip on a line along said inner side wall or said inner seal lip, said line being oblique or perpendicular to the longitudinal direction of the glass run, and
    said barrier rib, as viewed in a cross-sectional view which shows the U-shaped cross-section, has a generally triangular-plate shape, a side of said generally triangular-plate shape being disposed on said line which is oblique or perpendicular to the longitudinal direction of the glass run.

2. A glass run as claimed in claim 1, wherein said barrier rib formed between said inner side wall and said inner seal lip is formed continuously with one of said inner side wall and said inner seal lip so as to define a barrier gap against the other one of said inner side wall and said inner seal lip, and said barrier rib formed between said outer side wall and said outer seal lip is formed continuously with one of said outer side wall and said outer seal lip so as to define another barrier gap against the other one of said outer side wall and said outer seal lip.

3. A glass run as claimed in claim 1, wherein said barrier rib is formed away from said bottom wall.

4. A glass run as claimed in claim 1, wherein said barrier rib is formed so as to be inclined to the longitudinal direction of said glass run.

5. A glass run as claimed in claim 1, wherein said extruded part includes an upper side part adapted to be attached to an upper side of the door frame, and vertical side parts adapted to be attached to vertical sides of the door frame, and said molded parts include corner molded parts adapted to connect said upper side part to said vertical side parts and to be attached to corners of the door frame, and vertical side molded parts adapted to be connected to said vertical side parts in a vicinity of a belt line thereof.

6. A glass run as claimed in claim 1, wherein said barrier rib is formed in both said vertical side molded parts and said corner molded parts.

7. A glass run as claimed in claim 1, wherein said barrier rib has a thickness ranging from 0.8 mm to 2 mm.

8. A glass run for an automobile, which is adapted to be attached along an inner periphery of a door frame of an automobile door for guiding a door glass into a glass run as the door glass is raised and lowered, comprising:
    extruded parts formed by extrusion, and molded parts, each adapting to connect said extruded parts to each other by molding, wherein
    each of said extruded parts and said molded parts includes a main body having a bottom wall, an outer side wall that extends from an outer side edge of said bottom wall, and an inner side wall that extends from an inner side edge of said bottom wall, which define a generally U-shaped cross-section, a longitudinal direction of the glass run being perpendicular to the generally U-shaped cross-section,
    an outer seal lip and an inner seal lip are respectively provided in said outer side wall and said inner side wall so as to respectively extend from open ends of said outer side wall and said inner side wall in an interior of said main body with the generally U-shaped cross-section,
    a barrier rib is provided in at least one position of said molded parts at least one of between said inner side wall and said inner seal lip and between said outer side wall and said outer seal lip, the barrier rib is disposed on said inner side wall or said inner seal lip on a line along said inner side wall or said inner seal lip, said line being oblique or perpendicular to the longitudinal direction of the glass run, and
    said barrier rib between said inner side wall and said inner seal lip is continuous with one of said inner side wall and said inner seal lip so as to define a barrier gap against the other one of said inner side wall and said inner seal lip, and said barrier rib between said outer side wall and said outer seal lip is continuous with one of said outer side wall and said outer seal lip so as to define another barrier gap against the other one of said outer side wall and said outer seal lip.

* * * * *